Aug. 13, 1957    H. SCHOTTLER    2,802,373
BALL BEARING SCREW DEVICE
Filed Oct. 28, 1955
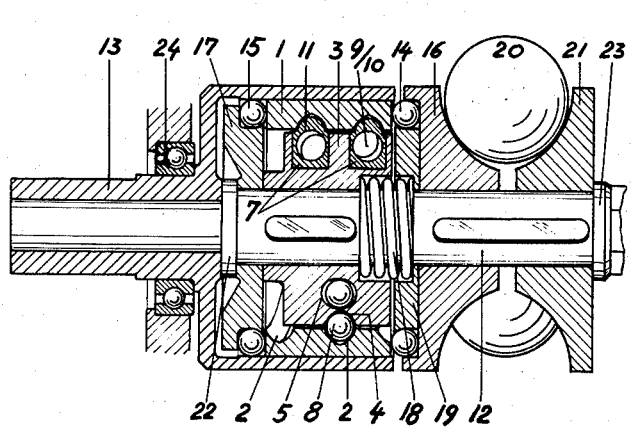
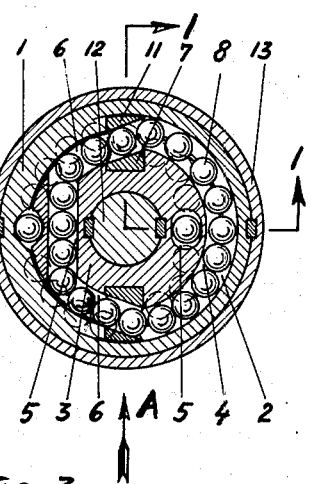
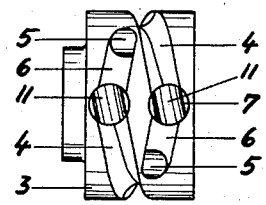
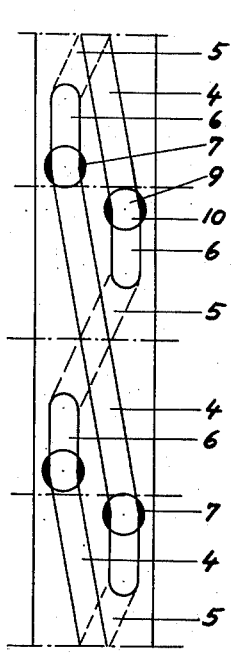
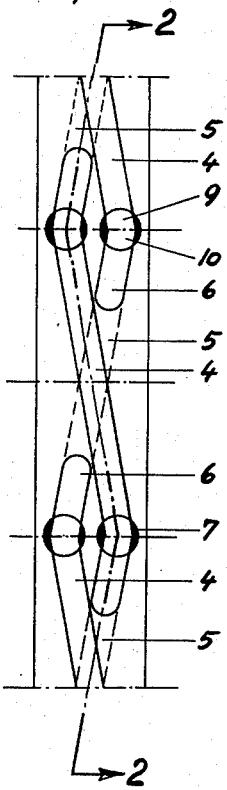
INVENTOR.
HENRY SCHOTTLER
By Fritz C. Hoeninghold
AGENT

United States Patent Office 2,802,373
Patented Aug. 13, 1957

2,802,373

BALL BEARING SCREW DEVICE

Henry Schottler, Houston, Tex., assignor to Roller Gear Company, Inc., New York, N. Y.

Application October 28, 1955, Serial No. 543,441

3 Claims. (Cl. 74—459)

The invention relates to ball bearing screw devices, particularly to such a device suitable for use as a pressure changer or torque responsive loading means in a variable speed drive transmission.

A great number of such ball bearing screw devices is known, but they are mostly of rather complicated construction or are liable to jamming under severe operating conditions.

It is a principal object of the invention to provide a ball bearing screw device of the character described, which is of simple construction and economic in manufacture, and which is reliable under all operating conditions.

Other objects and advantages will be apparent from a consideration of the specification and claims.

According to the invention, the balls rolling in a helical groove of the screw device formed by a male and female part are retained in a closed circle or spiral by a return passage connecting the ends of the helical groove; said return passage is arranged in the inner male part of the screw and comprises a bore crossing underneath said helical groove, which bore is connected with the ends of the helical groove by passages and guide members.

The invention will be more fully explained with reference to the accompanying drawings, in which one embodiment is illustrated by way of example, and in which:

Fig. 1 is a view in a longitudinal section along line 1—1 of Fig. 2 of a ball bearing screw device according to the invention;

Fig. 2 is a vertical sectional view taken on the plane indicated by line 2—2 of Fig. 4;

Fig. 3 is a view of the male part in direction A of Fig. 2;

Fig. 4 shows a development of the helical grooves with return passages of the male part, and Fig. 5 shows another development of the helical grooves and return passages in the male part, in which the guide pieces are shifted in order to extend the helical grooves.

The device illustrated in the drawings comprises an outer member as a female part with double helical grooves 2 at the inner circumference, an inner member as a male part 3 with identical double helical grooves 4 and return passages 5, 6, 9, 10, at the outer circumference and balls 8, combining the inner and outer members to a ball bearing screw. The return passages consist of straight bores 5 crossing underneath the helical grooves 4, connecting grooves 6, and guides 7 as inserts in the male part 3.

The guide pieces 7 define a bore, consisting of two parts 9 and 10, which form an angle with each other as indicated in Fig. 4; the bore has a diameter slightly larger than the ball diameter. The guide pieces 7, which have preferably a round cross section, extend into the helical grooves 2 of part 1. The raising 11, meshing the internal helical groove 2 of part 1 as indicated in Fig. 1 is following the lead with bore 9 as indicated in Fig. 3.

According to Figs. 1 and 2, the male part 3 is preferably non-rotatably but axially slideably connected by keys (or splines) with a shaft 12. Part 1 is also preferably non-rotatably but axially slideably located in a bushing-like part of a hollow shaft 13.

Shaft 12 is rotatably supported in said shaft 13. Two rows of balls 14 and 15 are located between the plane ends of part 1 and the race 16 on one side and a pressure disk 17 on the other side of the device, respectively.

A spring 18 is located in an annular recess between part 3 and a disk 19. Said disk 19 retains the free rolling balls 14 in their place. Another race 21 is rigidly connected with shaft 12. Balls 20 as power transmitting members are located between the races 16 and 21.

The operation of the novel pressure device is as follows:

Power is applied to shaft 13 which turns the female part 1. A thread action through balls 8 in the helical grooves 2 and 4 forces the female part 1 and male part 3 to move in peripheral and axial direction with respect to each other, pressing the races 16 and 21 against the balls 20. At the same time torque is applied through the balls 8 to the shaft 12 and the races 16 and 21. By selecting the right lead of the helical grooves, the proportion of pressures at points of contact to their tangential forces will prevent slippage at all load conditions.

Different axial positions of the races 16 and 21 will cause more or less screw-like displacement of male and female part (3, 1) of the pressure device. The balls 8 accordingly are free to move through holes 9, 10, the grooves 6 and bores 5 in order to form a circle for a smooth and safe uninterrupted operation.

Right hand thread of helical grooves and right hand torque action will force the races 16 and 21 against the balls 20 by pressing part 1 against the balls 14 to race 16, and part 3 against disk 17 and shoulder 22 of shaft 12, through shaft 12 and shoulder 23 to race 21.

Right hand thread of helical grooves and left hand torque action will force also the races 16 and 21 against the balls 20 by pressing part 1 against the balls 15, disk 17 and shoulder 22 of shaft 12, through shaft 12 and shoulder 23 to race 21, and part 3 against disk 19 to race 16.

The reaction forces compensate each other without transmitting any load to the ball bearings.

Since the female part 1 is turning with respect to its counterparts 16 and 17, balls 14 and 15 are necessary to eliminate friction.

In a pressure device for right hand operation only, the inner and outer members 3 and 1 are arranged preferably with right hand thread. The inner screw member 3 can be rigidly connected with shaft 12, eliminating balls 15 and disk 17.

Pressure devices for both directions, which are, however, more used for right hand action, have preferably right hand screw threads in order to keep the inner member 3 without sliding on shaft 12 in its position against disk 17 and shoulder 22.

Pressure devices for both directions which are however more used for left hand action have preferably left hand screw threads, again in order to keep the inner member 3 without sliding on shaft 12 in its position against disk 17 and shoulder 22.

The cross sections of the helical working grooves have preferably two radii, slightly larger than the ball radius, as indicated in Fig. 1, in order to get angular contact points for free rolling balls 8 under thrust load.

Instead of using inserts 7 with round cross section for ball guides, any other kind of guide can be employed to lead the balls 8 from the helical working grooves into the return passages or vice versa.

The return grooves 6 provide a free passage for the balls 8 underneath the smaller inner diameter of the outer member 1 between its internal helical grooves 4. Thus, the balls 8, when moving from the helical path 2, 4, into the return grooves 6, or vice versa, have to change position in radial direction only less than the ball radius.

Therefore, simple means like inserts 7 can be used as guides.

The present invention can be applied wherever a screw action is required.

Of course, in a single thread with a single return passage, only two guide pieces 7 are necessary.

In Fig. 5, the guide pieces 7 are shifted circumferentially to each other to extend the working threads.

The return grooves 6 as indicated in Fig. 5 are located parallel to planes perpendicular to the axis of the pressure device.

The return grooves 6 do not have to be straight as shown in Figs. 4 and 5. In most cases, the bore 5 will determine the kind and lead of the return grooves 6.

In some cases, instead of a straight bore 5 underneath a helical thread, an angular bore might be more convenient.

In the embodiment of the invention shown in Fig. 1, the balls 14 and 15 are rolling on plane surfaces of parts 1, 16 and 17. For higher permissible thrust loads, concave tracks may be arranged.

It will be understood that the embodiments of the invention shown in the drawings are illustrative only, and that details may be modified without departing from the scope of the invention. For instance, the helical grooves 4, which are shown to end with the openings for the inserts 7, may be extended for easier machining, and other modifications of the parts of the device may be made.

I claim:

1. A ball bearing screw device comprising an inner member having a helical thread, an outer member surrounding said inner member and having a cooperating helical thread, said threads forming a helical path, balls in said path, and a return passage in said inner member connecting the ends of said helical path and permitting free travel of said balls from one end of said path to the other end, said return passage comprising a bore crossing underneath said helical path and connected with either end of said path by a passage and a guide member.

2. A ball bearing screw device as defined in claim 1, wherein said guide members are inserts with circular cross section having bores slightly wider than the diameter of said balls for guiding said balls smoothly from said helical path into said return passage, and vice versa.

3. A ball bearing screw device as defined in claim 1, wherein said guide members are maintained in position by an extension entering into, and meshing with, the helical thread of said outer member.

References Cited in the file of this patent

UNITED STATES PATENTS

| | | |
|---|---|---|
| 2,127,335 | Hodgson | Aug. 16, 1938 |
| 2,450,282 | Jackson | Sept. 28, 1948 |
| 2,486,055 | Mort | Oct. 25, 1949 |
| 2,636,397 | Jacubenta | Apr. 28, 1953 |

FOREIGN PATENTS

| | | |
|---|---|---|
| 378,524 | France | Oct. 8, 1907 |